United States Patent [19]

Schuster et al.

[11] 3,719,731
[45] March 6, 1973

[54] HIGH-IMPACT MOULDING COMPOSITIONS AND PROCESS FOR PREPARING SAME

[75] Inventors: Herbert Schuster; Karl Nutzel; Karl Dinges; Karl-Heinz Ott, all of Leverkusen, Germany

[73] Assignee: Bayer Aktiengesellschaft

[22] Filed: July 29, 1970

[21] Appl. No.: 59,349

[30] Foreign Application Priority Data

Aug. 6, 1969  Germany...................P 19 39 894.8

[52] U.S. Cl. ..........260/878 R, 260/79.5, 260/878 B, 260/879, 260/880 R
[51] Int. Cl..............................C08f 1/04, C08f 19/00
[58] Field of Search........................260/878 R, 878 B

[56] References Cited

UNITED STATES PATENTS

| 3,374,191 | 3/1968 | Nutzel | 260/94.7 S |
| 3,523,145 | 8/1970 | Manaresi et al. | 260/878 R |
| 3,538,192 | 11/1970 | Bishop, Sr. | 260/878 R |

OTHER PUBLICATIONS

Chemical Abstracts, Volume 57 (2) Column 15,364d (1962).

Primary Examiner—James A. Seidleck
Assistant Examiner—A. Holler
Attorney—Connolly and Hutz

[57] ABSTRACT

A process for the production of high-impact moulding compositions by the bulk polymerization, bulk-suspension polymerization or suspension polymerization of olefinically unsaturated monomers in the presence of a rubber component and a catalyst, wherein the rubber component comprises A a block copolymer of
  a. 99 to 1 percent by weight of blocks of ethylene-propylene copolymer or ethylene-propylene terpolymer rubber, and
  b. 1 to 99 percent by weight of blocks of a diene rubber or polypentenamer rubber, and the olefinically unsaturated monomers comprise B. a mixture of
  a. 90 to 50 percent by weight of styrene, an α-alkyl styrene, a nuclear-alkylated styrene, methyl methacrylate or a mixture thereof, and
  b. 10 to 50 percent by weight of acrylonitrile, methacrylonitrile, methyl methacrylate or a mixture thereof, said rubber component comprising from 1 to 20 percent by weight of said moulding composition and said olefinically unsaturated monomers comprising from 99 to 80 percent by weight thereof.

12 Claims, No Drawings

HIGH-IMPACT MOULDING COMPOSITIONS AND PROCESS FOR PREPARING SAME

This invention relates to high-impact molding compositions based on elastic-thermoplastic graft copolymers containing as graft base a "block copolymer" of an ethylene-propylene rubber or an ethylene-propylene terpolymer rubber, and a diene or a polypentenamer rubber.

Graft polymers of styrene on a diene homopolymer or copolymer rubber are known as high-impact polystyrenes.

High-impact strength is also shown by ABS polymers, i.e. molding compositions obtained by the graft polymerization of, for example, styrene and acrylonitrile on to a butadiene homopolymer or copolymer, optionally followed by the incorporation of a separately prepared styrene-acrylonitrile copolymer.

High-impact polystyrene has a good impact strength and good flow properties. ABS polymers have the following additional advantageous properties: extreme toughness, high rigidity, good thermal stability, high resistance to solvents, excellent surface gloss and good processing properties.

All high-impact molding compositions which contain diene homopolymers or copolymers gradually lose their favorable mechanical properties and undergo ageing under technoclimatic conditions. Ageing is attributable to splitting of the carbon-carbon double bond in the rubber by atmospheric oxygen under the influence of air and heat.

Accordingly, attempts have been made to use elastomeric polymers containing no carbon-carbon double bonds, or only very few carbon-carbon double bonds, with a view to improving resistance to ageing. For example, polybutyl acrylate, copolymers of butyl acrylate with other monomers, such as ethyl acrylate, vinyl isobutyl ether or even relatively small quantities of butadiene, or other monomers still containing carbon-carbon double bonds after copolymerization, have been used for this purpose. Unfortunately, the molding composition thus obtained are decidedly inferior in other important properties (for example impact strength at low temperatures).

Compared with acrylate rubbers, ethylene-propylene copolymers and ethylene-propylene terpolymers have lower second-order transition temperature so that impact strength can be expected not to be impaired at low temperatures when these rubbers are used in the production of high-impact molding compositions by graft polymerization. Accordingly, attempts have already been made to produce two-phase plastics resembling "high-impact polystyrene" or ABS, with outstanding resistance to ageing, from rubbers of this kind. Such attempts have, however, been faced with the following difficulties:

1. Grafting by emulsion polymerization

Styrene and acrylonitrile cannot be grafted onto ethylene-propylene copolymer or ethylene-propylene terpolymer dispersions in the presence of emulsifiers because of the instability of the rubber latices (attributable to excessive particle size). Coagulates are formed during the graft polymerization reaction.

2. Grafting by suspension and block polymerization

Ethylene-propylene copolymers are insoluble in mixtures of styrene and acrylonitrile. Accordingly, block polymerization block-suspension polymerization, and suspension polymerization of styrene and acrylonitrile is not possible in the presence of these rubbers.

3. Although solubility of the ethylene-propylene copolymers in the monomer mixture, and the grafting behavior, can be improved to some extent by peroxidizing the rubber component beforehand, a process of this kind cannot be carried out on a commercial scale.

4. Although it is possible by using an ethylene-propylene terpolymer to increase the grafting yields in the grafting reaction to the required extent, difficulties are also encountered in this instance due to the insolubility of the terpolymer in the graft monomers.

Accordingly it was not possible to obtain products of this kind on a commercial scale, though the starting components and the properties of the products that could be obtained from them were known.

A process for the production of high-impact molding compositions by bulk-suspension or suspension polymerization of olefinically unsaturated monomers in the presence of a rubber component and a catalyst, has now been found in which A. a block copolymer of
  a. 99 to 1 percent by weight of blocks of ethylene-propylene copolymer or ethylene-propylene terpolymer rubber, and
  b. 1 to 99 percent by weight of blocks of a diene rubber or a polypentenamer rubber is used as the rubber component, and
B. a mixture of
  a. 90 to 50 percent by weight of styrene, an α-alkyl styrene, a nuclear-alkylated styrene, methyl methacrylate or a mixture thereof, and
  b. 10 to 50 percent by weight of acrylonitrile, methacrylonitrile, methyl methacrylate or a mixture thereof is used as the olefinically unsaturated monomers. The rubber component comprises from 1 to 20 percent by weight of the molding composition and the olefinically unsaturated monomers comprise from 99 to 80 percent by weight thereof.

The block polymer (A) is obtained from its constituents (a) and (b) by mixing solutions of the rubbers (a) and (b) and treating the resulting mixture with sulphur halides in accordance with German Patent No. 1,260,794 and U. S. Pat. No. 3,374,191 (which is incorporated by reference).

In contrast to untreated mixtures of the rubbers (a) and (b), mixtures treated with sulphur halides in accordance with German Patent No. 1,260,794 are soluble in the monomer mixtures (B), so that the polymerization processes referred to above can be carried out. The thus treated mixtures are referred to as "block polymers" because treatment with sulphur halides probably produces a linkage between the rubber (a) and (b). According to the invention, it is not only possible to use ethylene-propylene polymers for the synthesis of high-impact molding compositions, it is also possible to obtain graft polymers with "tailored" properties by appropriately selecting the type and quantity of the components of the block copolymer.

The invention also relates to molding compositions with the following composition:

A. from 1 to 20 percent by weight of a block copolymer consisting of a. 99 to 1 percent by weight of blocks of ethylene-propylene copolymer or ethylene-propylene terpolymer rubber, and
b. 1 to 99 percent by weight of blocks of diene rubber or polypentenamer rubber on to which B. 99 to 80 percent by weight of a monomer mixture of
a. 90 to 50 percent by weight of styrene, an α-alkyl styrene, a nuclear - alkylated styrene, methyl methacrylate or a mixture thereof, and
b. 10 to 50 percent by weight of acrylonitrile, methacrylonitrile, methyl methacrylate or a mixture thereof, has been graft-polymerized. Moulding compositions of the following composition are preferred:

A. from 1 to 20 percent by weight of a block polymer of
a. 99 to 50 percent by weight of blocks of ethylene-propylene rubber or ethylene-propylene-terpolymer rubber, and
b. from 1 to 50 percent by weight of blocks of diene rubber or polypentenamer rubber on to which B. from 99 to 80 percent by weight of a monomer mixture of
a. 90 to 50 percent by weight of styrene, α-methyl styrene, methyl methacrylate or a mixture thereof, and
b. from 10 to 50 percent by weight of acrylonitrile, methyl methacrylate or a mixture thereof has been grafted.

In principle, any diene rubber may be combined with any ethylene-propylene rubber or ethylene-propylene terpolymer rubber to prepare the block copolymer, the only condition being that the starting elastomers should be soluble in suitable solvents.

A polybutadiene with a 1,4-bond component in excess of 85 percent is preferably used as the diene rubber component (b) in the process according to the invention, whilst an ethylene-propylene terpolymer is preferably used as the rubber component (a). Polypentenamer is another preferred rubber (b).

To prepare the block copolymers (A) the two starting elastomers may be dissolved in an inert solvent, such as an aliphatic or aromatic hydrocarbon (concentration : 5 to 15 percent by weight), a sulphur halide, preferably $S_2Cl_2$, is added to the combined solutions at a reaction temperature of from 0° to 150°C in a quantity of from 0.05 to 5 percent by weight, based on the particular overall solids content of the solution, and the reaction mixture is stirred vigorously for a period of from 0.5 to 10 hours. It is also possible, however, to treat only one of the two elastomers with the sulphur halide, for example $S_2Cl_2$, and to add a solution of the second elastomer after a certain time (1 to 2 hours).

Formation of the block copolymers is reflected, for example, in an increase in the Mooney viscosity in comparison with the Mooney viscosity of the mixture of starting components. The difference between the Mooney viscosities is governed by the quantity in which the sulphur halide is added and also by the other reaction conditions.

The completed block copolymer can be precipitated from its solution by introduction into lower alcohols, such as methanol of ethanol. The solution may also be introduced into boiling water and the solvent distilled off with steam. It is of advantage to add a relatively small quantity of an anti-ager during this working-up stage.

In general, the following polymers may be used as diene component (b) of the block copolymer: homopolymers of butadiene, isoprene and piperylene, and their copolymers for example with styrene, acrylonitrile, acrylates, and methacrylates and fumarates, (in which the ester component preferably comprises an aliphatic alcohol with one to six carbon atoms). In general, the comonomer component should not exceed 50 percent by weight, because otherwise the low-temperature behavior of the molding composition would be adversely affected. It is also possible to copolymerize several of the aforementioned comonomers with one of the aforementioned dienes or to use dienes themselves as comonomers.

Butadiene/styrene segment polymers may also be used as the diene component for the block copolymer.

The diene component of the block copolymer or the polypentenamer should preferably have a Mooney viscosity (ML 4' 100° C) of from 10 to 100 and should preferably be soluble or substantially soluble in an inert solvent.

The following are suitable saturated rubber-elastic components for the block copolymer:
ethylene-propylene copolymers obtained by copolymerizing 70 to 30 percent by weight of ethylene and 30 to 70 percent by weight of propylene with mixed catalysts by the Ziegler method, and preferably ethylene-propylene terpolymers obtained by copolymerizing 69 to 35 percent by weight of ethylene, 30 to 65 percent by weight of propylene and 0.5 to 10 percent by weight of one or more multi-olefins with at least five carbon atoms. Multi-olefins are olefins containing at least two non-conjugated double bonds, for example bis-cyclopentadiene, cyclo-octadiene, tri-vinyl cyclohexane, 2,5-hexadiene and 1,4-hexadiene.

The quantity in which the multi-olefin is present in the terpolymers is governed by the required degree of grafting of the graft polymer to be prepared. It is less critical here than when only the terpolymer is used as graft base. The elastomer as a whole should preferably not contain any more than 10 percent by weight of multiolefins. In this instance too, the Mooney viscosity (ML 4' 100°C) should be from 10 to 100. The completed block copolymer should also preferably have Mooney values (ML 4' 100° C) of from 10 to 100 and most preferably from 10 to 50.

A preferred graft monomer mixture consists of from 50 to 90 percent by weight of styrene and from 10 to 50 percent by weight of acrylonitrile.

The processing properties of all the thermoplastic twophase - plastics of the high-impact polystyrene or ABS type are primarily governed by the molecular weight of the grafted-on or admixed resin polymer. Accordingly, molecule weight regulators, such as n- or tert.-dodecyl mercaptan, can be added to the graft monomers, in order to influence the flow properties of the final molding composition.

The block copolymers described above are soluble in the graft monomer mixture. Accordingly, the manufacturing processes conventionally used for the production of high-impact molding compositions, for example block polymerization in a reaction screw or suspension polymerization, may also be used in this process.

The molding compositions according to the invention are, however, preferably prepared by a two stage process which can be characterized as follows:

A solution of from 1 to 20 percent by weight of block copolymer in 99 to 80 percent by weight of an graft monomer mixture is polyermized, either under heat or with suitable monomer-soluble initiators, to a conversion of 20 to 30 percent by weight, based on the monomer used, (i.e. up to phase inversion) after which the prepolymer thus obtained is suspended, with suitable suspension stabilizers such as partly hydrolized polyvinyl acetate or hydroxyethyl cellulose, in 1 to 5 times its quantity of water, and the suspension polymerization reaction is subsequently carried through to completion. In both polymerization stages, the reaction temperatures should be from 80° to 180° C. Suitable initiators are for instance monomer-soluble radical forming catalysts as peroxide and azo-compounds, e.g. benzoyl peroxide, lauroyl peroxide, tert. butyl perbenzoate, di-tert. butyl peroxide. It is preferred to use monomer-soluble initiator combinations of (i) a peroxide or an azo initiator with a half-life of less than 10 hours at 100° C, such as lauroyl peroxide, benzoyl peroxide or azodiisobutyrodinitrile, and (ii) a peroxide compound which has a half-life of more than 10 hours at only 100° C, for example tert.-butyl perbenzoate or di-tert.-butyl peroxide.

The initiator is preferably used in a quantity of from about 0.05 to 1 percent by weight, based on the reaction mixture. This amount may be added in total at the start of the first stage, or only a part may be added and the remainder at the start of the second stage.

The graft polymers which accumulate in granulate or bead form, depending on the method of production, may optionally be freed from any residual monomers still present in them in known manner, optionally after drying, and can then be further processed.

Further processing includes the incorporation of such conventional additives as, for example, anti-agers such as di-tert.butyl-*p*-cresol, lubricants such as stearyl alcohol or butyl stearate, antistatic agents, and desired pigments.

The granulate obtained after this compounding may then be converted into injection moldings of any kind, using, for instance, screw injection molding machine or ram-type injection molding machines, or alternatively may be processed into tubing, sheeting or sections, i.e. semi-finished products, using single-or-double-screw extruders.

It is possible, by virtue of the process according to the invention, to obtain materials which show all the properties of ABS molding compositions coupled with improved ageing behavior.

The process according to the invention is illustrated in the following examples in which parts are always parts by weight unless otherwise stated.

DISSOLUTION TESTS

In order to demonstrate the purely technological significance of the process according to the invention the solubility behavior of different polymers are compared with one another in Examples 1 to 6.

For this purpose, 8 parts of rubber elastomer were introduced in 92 parts of a mixture of 74 parts of styrene and 18 parts of acrylonitrile and the mixture was stirred for 8 hours at 20°C and 40°C. Solubility was initially visually assessed.

These solubility tests were carried out with

Test 1

A cis-polybutadiene with a cis-1,4-bond component of 89 percent, and a Mooney viscosity (ML 4' 100°C) of 45 (Commercial Product, Buna CB 11 (R)).

Test 2

An ethylene-propylene copolymer comprising approximately 46 percent by weight of ethylene and 54 percent by weight of propylene, having a Mooney value (ML 4' 100°C) of 40 (Commercial Product, Vistalon 405 (R)).

Test 3

An ethylene-propylene terpolymer comprising 60 percent by weight of ethylene, 40 percent by weight of propylene and 1.2 mol percent of dicyclopentradiene, with a Mooney value (ML-4' 100°C) of 41.

Test 4

A block copolymer of:
80 parts by weight of the cis-polybutadiene mentioned in 1, and 20 parts by weight of the ethylene-propylene terpolymer mentioned in 3, with a Mooney viscosity of 61, prepared as follows:

A solution of 80 parts by weight of cis-polybutadiene in 800 parts by weight of toluene is introduced into a glass reaction vessel equipped with stirring mechanism, thermometer and a ring pipe leaving at the base and re-entering at the cover, with a pump inbetween.

The solution is freed from air and water by bubbling nitrogen through it for 10 minutes at a rate of 1 liter per minute. After the pump has been switched on, 0.4 percent by weight of $S_2Cl_2$ (based on cispolybutadiene) in the form of a 10 percent by weight solution in toluene is added immediately upstream of the pump in the time required by the liquid to complete one circuit. The solution is pumped around for another 60 minutes, undergoing an increase in temperature to 50°C. A solution of 20 parts by weight of ethylene-propylene terpolymer rubber in 200 parts by weight of toluene, which had been freed beforehand from water and oxygen by bubbling nitrogen through it, is then added without any interruption in circulation. After another 30 minutes, a solution of the resulting block copolymer is introduced into 5,000 times the quantity of ethanol and precipitated.

The block copolymer is then dried in a vacuum drying cabinet at a temperature of 60°C.

Test 5

A block copolymer of:
80 parts by weight of the ethylene-propylene terpolymer mentioned in 3, and
20 parts by weight of ths cis-polybutadiene mentioned in 1, with a Mooney viscosity (ML 4' 100°C) of 64, obtained by the method described in 4, the solution of the terpolymer being added first and the solution of the cis-polybutadiene added later.

Test 6

A mixture of:
80 parts by weight of the ethylene-propylene terpolymer mentioned in 3, and
20 parts by weight of the cis-polybutadiene mentioned in 1, prepared by the method described in 4, except that no $S_2Cl_2$ was added.

The solubility of the aforementioned polymers in the styrene-acrylonitrile mixture is shown in Table 1. Only the cis-polybutadiene (1) and the block copolymers according to the invention (4,5) are soluble in the styrene-acrylontrile mixture.

TABLE 1

| Test | Polymer | Solubility at 20°C | Solubility at 40°C |
|---|---|---|---|
| 1 | cis-polybutadiene | soluble | soluble |
| 2 | ethylene-propylene copolymer | insoluble | insoluble |
| 3 | ethylene-proplyene terpolymer | insoluble | insoluble |
| 4 | block copolymers of 80 parts by weight of cis-polybutadiene CB 11 20 parts by weight of ethylene-propylene terpolymer EP 1 | soluble | soluble |
| 5 | block copolymer of 80 parts by weight of EP 1 20 parts by weight of CB 11 | not completely soluble | soluble |
| 6 | mixture of 80 parts by weight of EP 1 20 parts by weight of CB 11 | insoluble | insoluble |

EXAMPLE 1

The following were introduced into a refined steel autoclave equipped with a high-speed stirrer producing a high shear gradient, two flow baffles and a thermometer socket:

6765.0 parts by weight of a solution of
600.0 parts by weight of the block copolymer according to test 5
7.5 parts by weight of dodecyl mercaptan and
7.5 parts by weight of di-tert.-butyl-p-cresol in
6150.0 parts by weight of a monomer mixture consisting of
4,800 parts of styrene and
1,350 parts of acrylonitrile After the air has been displaced with nitrogen, the mixture is activated with
375.0 parts by weight of styrene
3.75 parts by weight of di-tert.-butyl peroxide, and
7.50 parts by weight of benzoyl peroxide the stirrer is switched on and a reaction temperature of from 75° to 80°C adjusted.

After a conversion of 30 percent (based on the total solids content) has been reached, the reaction mixture is cooled to 40°C and reactivated with
375.0 parts by weight of styrene
7.5 parts by weight of di-tert.-butylperoxide, and
11.5 parts by weight of benzoyl peroxide.

The resulting solution is suspended in a mixture of:
24,000.0 parts by weight of desalted water
36.0 parts by weight of a partially hydrolyzed polyvinyl acetate (Moviol (R) 50/88)
4.8 parts by weight of a n-dodecyl benzene sulphonate (sodium salt), and
19.2 parts by weight of sodium chloride and the suspension polymerization reaction is carried out using the following temperature sequence:
7 hours at 75°C, 2 hours at 90°C, 3 hours at 110°C and 5 hours at 130° to 150°C.

The resulting bead polymer, accumulating in a yield of approximately 98 percent, is filtered under suction, washed with water and dried in vacuo at 70°C.

The dried reaction product is fused in a screw, freed from residual monomers, and further processed into a granulate following the addition of 0.5 percent by weight of calcium stearate (based on solid polymer) and 0.5 percent by weight of 2,6-di-tert.-butyl-p-cresol. The resulting granulate is converted in a screw injection molding machine into standard small test bars, whose physical data shown under 1 in Table 2 are determined.

EXAMPLE 2

The procedure is as in Example 1 except that the block copolymer described in Test 4 is used as the graft base. The physical data determined on standard small test bars are set out in Table 2 under 2.

COMPARISON EXAMPLE A

If the block copolymer of Example 1 is replaced by a cispolybutadiene according to Test 1, with the remaining procedure as in Example 1, the data set out in Table 2 under A are obtained from the corresponding test specimens.

TABLE 2

| Example No. | 1 | 2 | A |
|---|---|---|---|
| graft base content (in %) | 8.0 | 8.0 | 8.0 |
| notched impact strength according to DIN 53453 kp cm/cm² 20°C | 10.5 | 10.3 | 9.5 |
| Impact strength according to DIN 53453 kp cm/cm² 20°C | 65.0 | 64.3 | 67.2 |
| ball indentation hardness according to DIN 53456 kp/cm² | 1050 | 1010 | 1030 |
| thermal stability under load according to Vicat °C DIN 53460 | 98 | 97 | 98 |

There is hardly any difference between the most important mechanical properties of the molding compositions according to Examples 1 and 2 and those of the molding composition according to comparison Test A produced with cis-polybutadiene as the graft base. However, comparison of the impact strengths of the molding compositions according to Example 1 and comparison Example A after artificial ageing, that is to say after Xenon irradiation according to draft DIN Specification 53,389, using a turning mechanicam at 65 to 70 percent relative humidity in the test chamber, shows that the molding composition according to Example 1 is considerably better, as demonstrated in Table 3.

TABLE 3

| Example No. | 1 | A |
| --- | --- | --- |
| Irradiation time in hours | Impact strength DIN 53 453 20°C kp cm/cm² | Impact strength DIN 53 453 20°C kp cm/cm² |
| 0 | 65 | 67.2 |
| 50 | 56 | 15.4 |
| 100 | 50 | 13.8 |
| 150 | 40 | 10.8 |

The following block copolymers are prepared by the method used in Test 4:

EXAMPLE 3

A block copolymer of:
50 parts by weight of an ethylene-propylene terpolymer according to Test 3, and
50 parts by weight of butadiene-styrene copolymer with 25 percent by weight of statistically distributed styrene and a Mooney Viscosity of 58, which after the $S_2Cl_2$ treatment has a Mooney viscosity of 80.

EXAMPLE 4

A block copolymer of:
50 parts by weight of polypentenamer, Mooney value 58, and
50 parts by weight of an ethylene-propylene bis-cyclopentadiene terpolymer which contains the monomers in the ratio by weight of 50 : 45 : 5 and which has a Mooney value of 48, with a Mooney viscosity of 65 after the $S_2Cl_2$ reaction.

Following the procedure of Example 1 under the conditions of that Example, 90 parts by weight of a mixture of styrene and acrylonitrile (75 parts by weight of styrene, 25 parts by weight of acrylonitrile) are grafted on to these graft bases. After further processing into standard small test specimens as in Example 1, the data set out in Table 4 were obtained.

TABLE 4

| Example No. | 3 | 4 |
| --- | --- | --- |
| notched impact strength kp/cm/cm² | 12.5 | 13.4 |
| impact strength kp cm/cm² DIN 53 453 | 90.8 | 95.6 |
| hardness kp/cm² DIN 53 456 | 960 | 910 |

We claim:

1. In the process for the production of high-impact molding compositions by bulk polymerization, bulk suspension polymerization or suspension polymerization of an olefinically unsaturated monomer component in the presence of a rubber component and a catalyst, the improvement wherein the rubber component (A) comprises:
   a copolymer formed by reacting
      a. 99 to 1 percent by weight of an ethylene-propylene copolymer or an ethylene-propylene terpolymer rubber, and
      b. 1 to 99 percent by weight of a diene rubber or polypentenamer rubber with from 0.05 to 5 percent by weight, based on the combined weight of said (a) and (b) of a sulphur halide, and the olefinically unsaturated monomer component (B) comprises
   a mixture of
      a. 90 to 50 percent by weight of styrene, an α-alkyl styrene, a nuclear-alkylated styrene, methyl methacrylate or a mixture thereof, and
      b. 10 to 50 percent by weight of acrylonitrile, methacrylonitrile, methyl methacrylate or a mixture thereof, said rubber component comprising from 1 to 20 percent by weight of said molding composition and said olefinically unsaturated monomer component comprising from 99 to 80 percent by weight thereof.

2. A process as claimed in claim 1, wherein the rubber component (A) is a copolymer formed by reacting:
   a. from 99 to 50 percent by weight of an ethylene-propylene rubber or an ethylene-propylene terpolymer rubber and
   b. from 1 to 50 percent by weight of a diene rubber or polypentenamer rubber with said amount of sulphur halide.

3. A process as claimed in claim 1, wherein the rubber component (A) is a copolymer formed by reacting:
   a. from 99 to 50 percent of an ethylene-propylene terpolymer rubber comprising from 69 to 35 percent by weight of ethylene, 30 to 65 percent by weight of propylene and 0.5 to 10 percent by weight of a multi-olefin having at least five carbon atoms, and
   b. from 1 to 50 percent by weight of polybutadiene with a 1,4-bond component in excess of 85 percent with said amount of sulphur halide.

4. A process as claimed in claim 1 wherein the rubber component (A) is a copolymer formed by reacting:
   a. from 99 to 50 percent by weight of an ethylene-propylene terpolymer rubber comprising from 69 to 35 percent by weight of ethylene, 30 to 65 percent by weight of propylene and 0.5 to 10 percent by weight of a multi-olefin having at least five carbon atoms, and
   b. from 1 to 50 percent by weight of a polypentenamer with said amount of sulphur halide.

5. A process as claimed in claim 1 wherein component (B) comprises
   a. 90 to 50 percent by weight of styrene, α-methyl styrene, methyl methacrylate, or a mixture thereof, and
   b. 1 to 50 percent by weight of acrylonitrile, methyl methacrylate, or a mixture thereof.

6. A process as claimed in claim 1 wherein the rubber component (A) and the olefinically unsaturated monomer component (B) are bulk polymerized in a reaction screw.

7. A process as claimed in claim 1 wherein a solution of the rubber component (A) in the olefinically unsaturated monomer component (B) is polymerized up to phase inversion at a conversion of 20 to 30 percent by weight, based on monomer used, and the resulting prepolymer is suspended in from 1 to 5 times its quantity of water, and the resulting suspension is polymerized to completion, both polymerization stages being conducted at a temperature of from 80° to 180°C.

8. A process as claimed in claim 1 wherein polymerization is carried out in the presence of from 0.05 to 1 percent by weight, based on reaction mixture, of catalyst.

9. A process as claimed in claim 1 wherein polymerization is carried out in the presence of a catalyst composition comprising
   i. a peroxide or an azo initiator with a half life of less than 10 hours at 100°C. and
   ii. a peroxide compound which has a half life or more than 10 hours at 100°C.

10. A process as claimed in claim 9 wherein the catalyst composition comprises
    i. lauroyl peroxide or azodiisobutyronitrile, and
    ii. tert.-butyl perbenzoate or di-tert.-butyl peroxide.

11. A thermoplastic molding composition consisting of a graft polymer of
    A. from 1 to 20 percent by weight of a rubber component which is a copolymer of
       a. 99 to 1 percent by weight of an ethylene-propylene copolymer or an ethylene-propylene terpolymer rubber, and
       b. from 1 to 99 percent by weight of a diene rubber or polypentenamer rubber reacted with from 0.05 to 5 percent by weight, based on the combined weight of said (a) and (b) of a sulphur halide, and
    B. from 99 to 80 percent by weight of an olefinically unsaturated monomer component which is a mixture of
       a. 90 to 50 percent by weight of styrene, an $\alpha$-alkyl styrene, a nuclear-alkylated styrene, methyl methacrylate or a mixture thereof, and
       b. from 10 to 50 percent by weight of acrylonitrile, methacrylonitrile, methyl methacrylate or a mixture thereof.

12. A molding composition as claimed in claim 11 wherein the olefinically unsaturated monomer component (B) comprises
    a. 90 to 50 percent by weight of styrene, $\alpha$-methyl styrene methyl methacrylate or a mixture thereof, and
    b. 10 to 50 percent by weight of acrylonitrile, methyl methacrylate or a mixture thereof.

* * * * *